United States Patent
Monchiero et al.

(10) Patent No.: US 12,389,830 B2
(45) Date of Patent: Aug. 19, 2025

(54) METHOD AND HARVESTING MACHINE FOR HARVESTING FRUITS FROM THE GROUND

(71) Applicant: MONCHIERO & C. S.N.C., Bra (IT)

(72) Inventors: Massimo Monchiero, Bra (IT); Giancarlo Rinero, Bra (IT)

(73) Assignee: MONCHIERO & C. S.N.C., Bra (IT)

( * ) Notice: Subject to any disclaimer, the term of this patent is extended or adjusted under 35 U.S.C. 154(b) by 845 days.

(21) Appl. No.: 17/470,112

(22) Filed: Sep. 9, 2021

(65) Prior Publication Data
US 2022/0071094 A1 Mar. 10, 2022

(30) Foreign Application Priority Data
Sep. 10, 2020 (IT) .......... 102020000021472

(51) Int. Cl.
*A01D 51/00* (2006.01)
(52) U.S. Cl.
CPC ............... *A01D 51/002* (2013.01)
(58) Field of Classification Search
CPC .......... A01D 51/00; A01D 51/002; A01D 89/00–89/008
See application file for complete search history.

(56) References Cited

U.S. PATENT DOCUMENTS

| | | | | |
|---|---|---|---|---|
| 3,261,152 A | * | 7/1966 | Johnson | A01D 51/002 56/328.1 |
| 3,450,138 A | * | 6/1969 | Gunyou | A01F 11/06 460/44 |
| 3,469,691 A | * | 9/1969 | Boyce | A01D 33/08 209/147 |
| 3,673,774 A | * | 7/1972 | Mizzi | A01D 45/10 56/60 |
| 3,777,462 A | * | 12/1973 | Sharp | A01D 51/002 56/328.1 |
| 4,078,683 A | * | 3/1978 | Hansen, Jr. | A23N 12/005 414/416.09 |

(Continued)

FOREIGN PATENT DOCUMENTS

| | | |
|---|---|---|
| EP | 3413700 B1 | 4/2021 |
| ES | 2148074 A1 | 10/2000 |

(Continued)

OTHER PUBLICATIONS

Italian Search Report and Written Opinion dated May 10, 2021 for Italian Application No. IT202000021472, Applicant, Monchiero & C. S.N.C. (8 pages).

(Continued)

*Primary Examiner* — Joseph M Rocca
*Assistant Examiner* — Madeline I Runco
(74) *Attorney, Agent, or Firm* — KLINTWORTH & ROZENBLAT LLP

(57) ABSTRACT

A method and a harvesting machine for harvesting fruit from the ground, according to which fruit is harvested by means of a harvesting device, which is configured to form a harvested material flow consisting of fruit and foreign bodies, to move the harvested material along a cleaning path and to clean the harvested material by removing the foreign bodies from the fruit; the cleaning being carried out by sending an airflow coming from above the moving path towards the harvested material.

7 Claims, 5 Drawing Sheets

(56) References Cited

U.S. PATENT DOCUMENTS

| | | | | |
|---|---|---|---|---|
| 4,262,477 A | * | 4/1981 | Turold | A01D 45/006 56/16.5 |
| 5,930,987 A | * | 8/1999 | Urich | A01D 45/00 56/16.6 |
| 6,033,305 A | * | 3/2000 | Perez | A01D 45/006 460/99 |
| 7,131,254 B2 | | 11/2006 | Flora et al. | |
| 7,921,628 B2 | | 4/2011 | Meester | |
| 8,286,798 B2 | * | 10/2012 | Ricketts | A01D 45/028 460/44 |
| 2012/0208609 A1 | * | 8/2012 | Ricketts | A01D 90/02 460/84 |
| 2015/0089913 A1 | * | 4/2015 | Maisonneuve | A01D 51/002 56/14.7 |

FOREIGN PATENT DOCUMENTS

| | | | | |
|---|---|---|---|---|
| FR | 2340060 A1 | | 9/1977 | |
| FR | 2522468 A2 | * | 9/1983 | |
| FR | 2681215 A1 | | 3/1993 | |
| FR | 2702923 A1 | * | 9/1994 | A01D 51/002 |
| FR | 2879890 A1 | * | 6/2006 | A01D 51/002 |

OTHER PUBLICATIONS

Italian Search Report and Written Opinion dated May 19, 2021 for Italian Application No. IT202000021481, Applicant, Monchiero & C. S.N.C. (7 pages).

\* cited by examiner

METHOD AND HARVESTING MACHINE FOR HARVESTING FRUITS FROM THE GROUND

CROSS-REFERENCE TO RELATED APPLICATIONS

This patent application claims priority from Italian patent application no. 102020000021472 filed on Sep. 10, 2020, the entire disclosure of which is incorporated herein by reference.

TECHNICAL FIELD

The invention relates to a method and to a harvesting machine for harvesting fruit from the ground.

BACKGROUND OF THE INVENTION

In order to harvest fruit—such as chestnuts, hazelnuts, apples, etc.—from the ground in a mechanized manner, self-propelled or towed harvesting machines are known, which comprise a cart and a harvesting device, generally known as pickup, which is mounted on board the cart and is moved along a harvesting path, where it harvests the fruit and, together with it, a plurality of foreign bodies, which are mixed with or arranged around the fruit. The harvested material is fed towards a fruit output and along a cleaning path, where the foreign bodies are progressively eliminated as much as possible.

The cleaning is generally carried out during the movement of the product on conveyor belts, by making through openings in the belts, through which at least part of the foreign bodies, such as crushed stones, sand, etc., falls—due to gravity—to the ground underneath, and/or by associating the belts with sucking devices, which suck the parts having a greater volatility, such as leaves, small branches, etc.

Even though they are used worldwide, known harvesting machines of the type described above do not fulfil the need for a more and more accurate cleaning of the harvested fruit, in order to avoid or reduce following cleaning operations, which nowadays still have to be carried out on the fruit unloaded from the machine.

SUMMARY OF THE INVENTION

The object of the invention is to provide a harvesting machine whose designing features solve, in a simple and economic fashion, the problem discussed above and, in particular, compared to known solutions, increase the degree of cleaning of the fruit coming out of the machine.

A further object of the invention is to provide a low-cost, compact harvesting machine, which ensures high efficiency and functional reliability.

According to the invention, there is provided a harvesting machine for harvesting fruit from the ground; the machine comprising a cart, which is configured to move on a harvesting ground in a harvesting direction; at least one picking member for picking up, from the ground, a harvested material consisting of said fruit and of foreign bodies, which are mixed with or arranged around the fruit; an output opening for the fruit; means for feeding said harvested material towards said output along a cleaning path for the harvested material and cleaning means arranged along said cleaning path in order to separate said foreign bodies from said fruit, characterised in that said cleaning means comprise blowing means, which are configured to generate an airflow for cleaning the harvested material and comprise at least one outlet for said cleaning airflow; said outlet being arranged above said cleaning path and being oriented so as to direct said cleaning airflow towards said harvested material.

The invention further relates to a method for harvesting fruit from the ground.

BRIEF DESCRIPTION OF THE DRAWINGS

The invention will now be described with reference to the accompanying drawings, which show a non-limiting embodiment thereof, wherein.

DETAILED DESCRIPTION OF THE INVENTION

Figure 1:
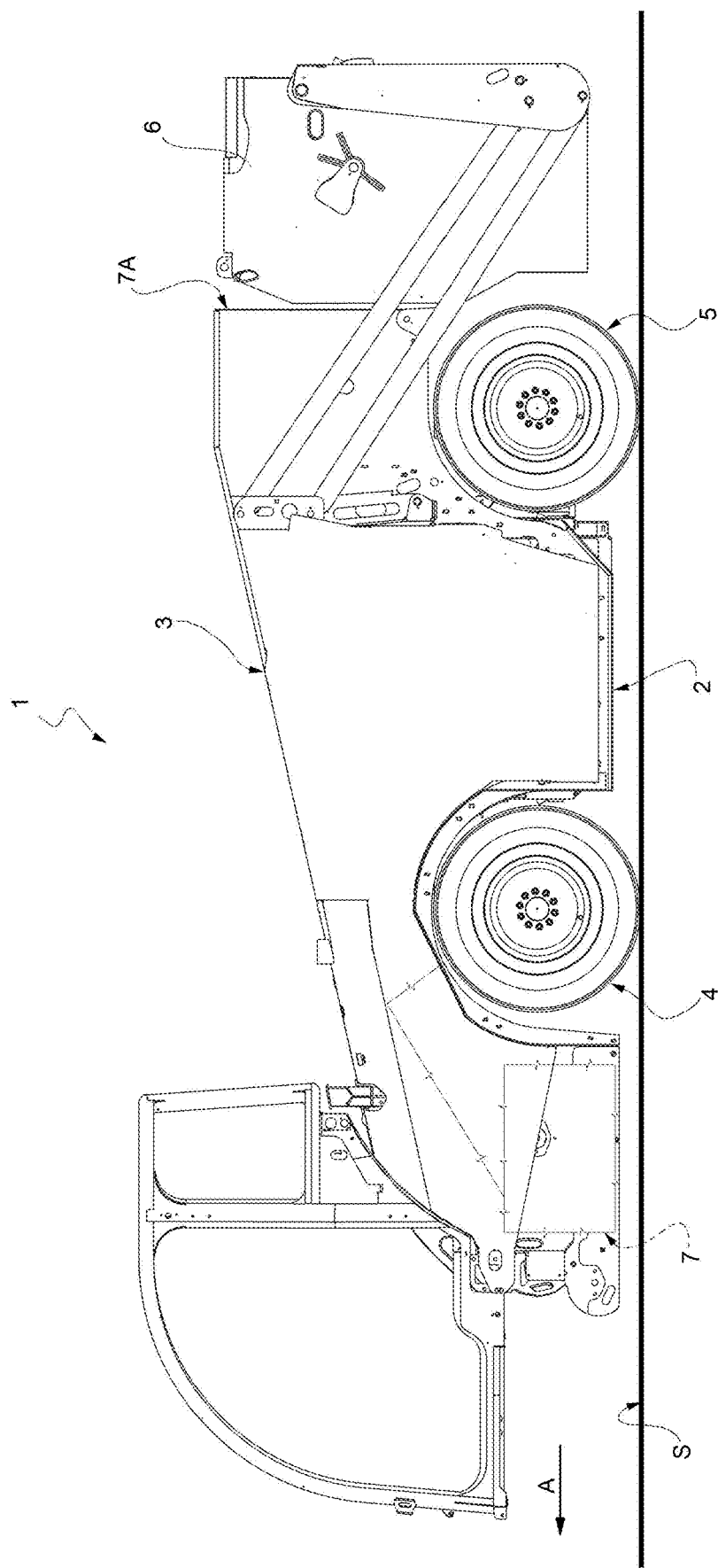
FIG. 1 shows, in side elevation, a first preferred embodiment of a harvesting machine for harvesting fruit from the ground according to the invention.

In FIG. 1, number 1 indicates, as a whole, a self-propelled harvesting machine for harvesting fruit from the ground, such as, for example, chestnuts, hazelnuts, almonds, apples, etc.

The machine 1 comprises a self-propelled or motorised cart 2, which is designed to be moved, in use, in a harvesting direction A and on a ground S on which there is fruit to be harvested, but there also are foreign bodies, such as leaves, small branches, crushed stones, soil and dust in general.

The cart comprises a frame 3 and, in the front direction A, a front axle 4 and a rear axle 5, at least one of them or both of them being motorised.

According to a variant which is not shown herein, the cart 2 is not self-propelled, but comprises a towing bar for the attachment of a towing tractor (which is not shown).

Regardless of whether it is self-propelled or not, the machine 1 comprises a rear container 6, which, in the example described herein, is carried by the frame 3 in order to collect the harvested fruit coming out of an output 7A of the machine 1.

According to a variant, the machine 1 has no container 6 and the container 6 is arranged on board an additional cart towed by the machine 1 or following the machine 1.

Regardless of whether it is self-propelled or carries the container 6 on board or not, the machine 1 comprises, adjacent to the front axle 4, a known harvesting device, generically indicated with 7, to harvest the harvesting material from the ground.

Figure 2:
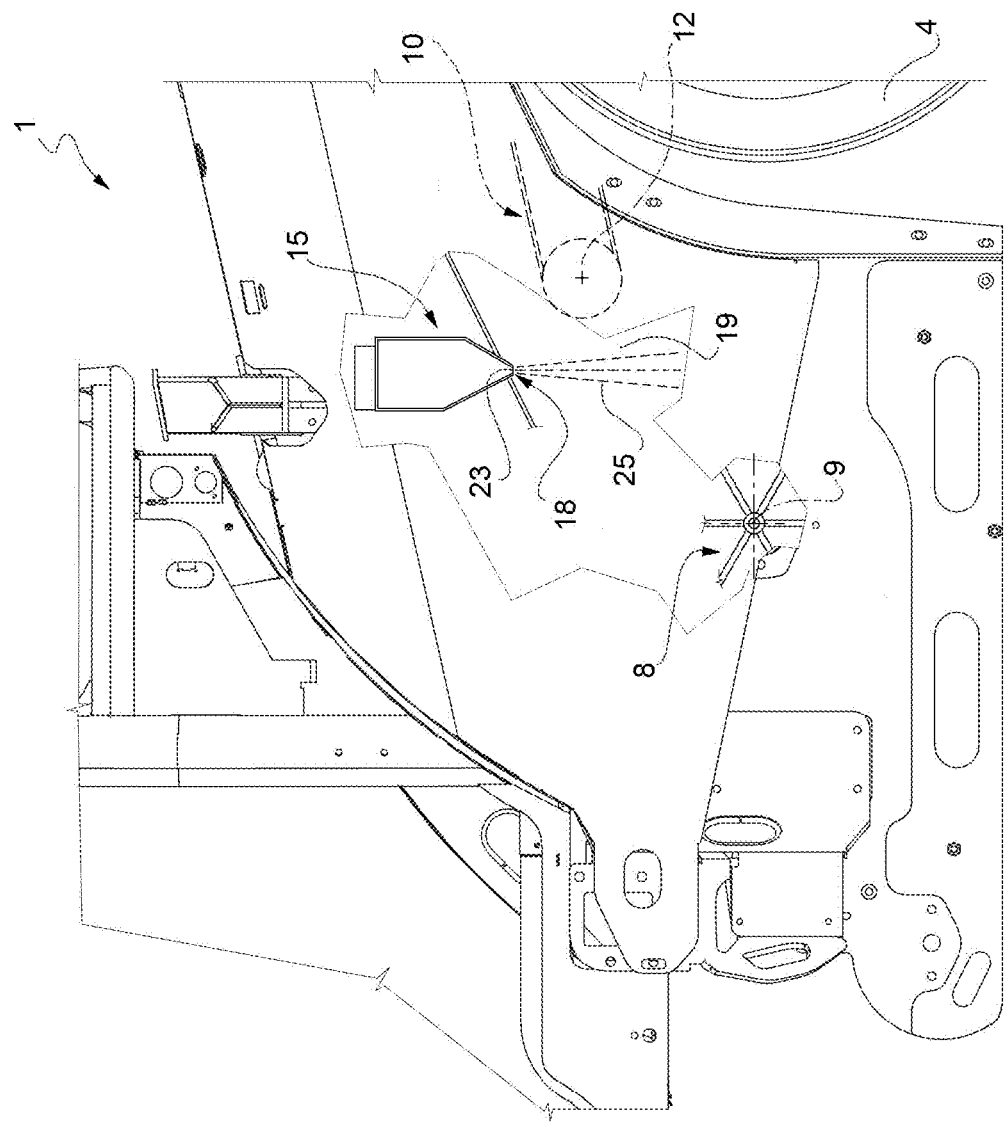
FIG. 2 shows, on a larger scale and with parts removed for greater clarity, a front portion of the harvesting machine of FIG. 1.
Figure 4:
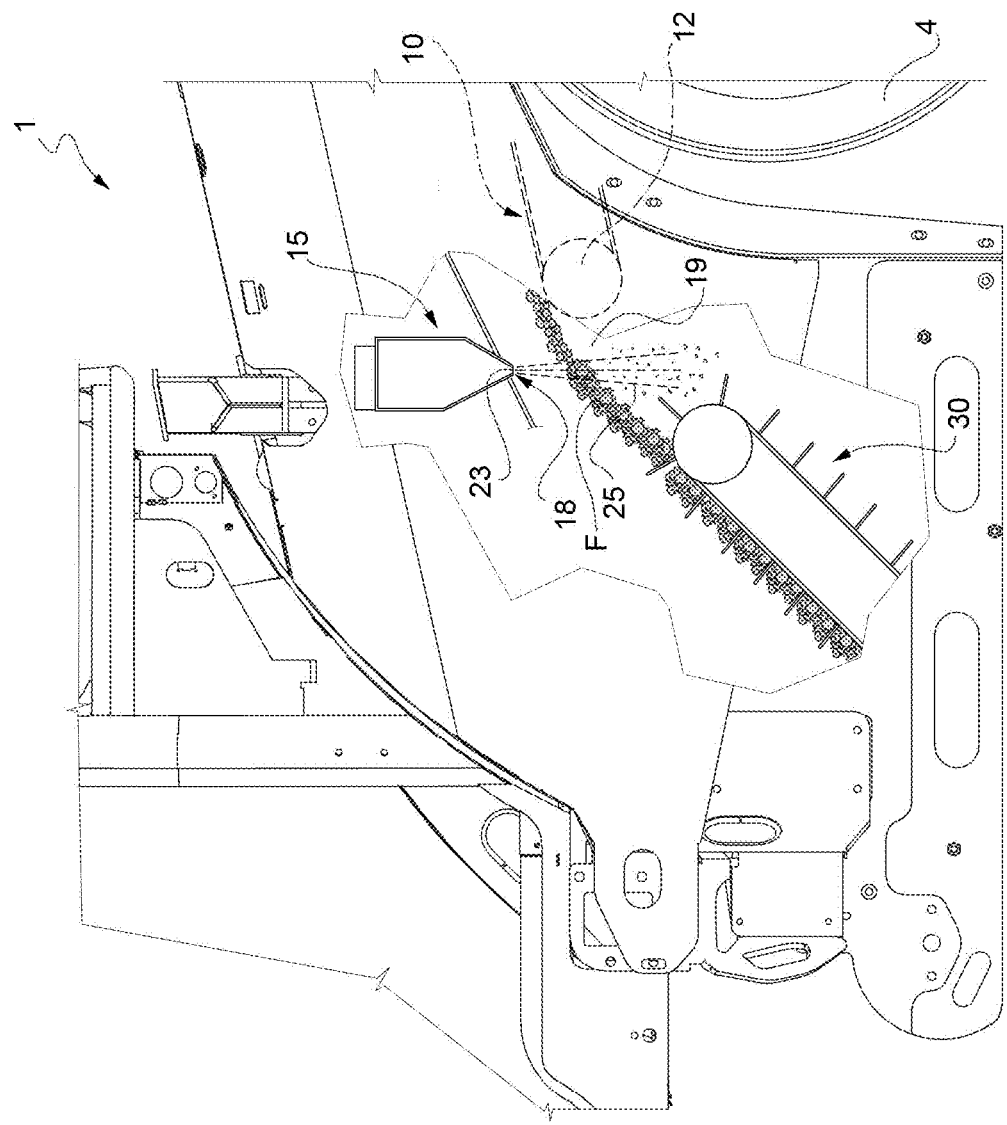
FIG. 4 is similar to FIG. 2 and shows a variant of a detail of FIG. 2.

With reference to FIG. 2 and, in particular, to FIG. 4, the harvesting device 7 comprises a pickup roller 8, for example with blades, which is coupled to the frame 3 so as to rotate around a fixed horizontal axis 9 orthogonal to the harvesting direction A and is motorised by means of a hydraulic actuator or another equivalent angular actuator.

During its rotation, the pickup roller 8 forms a harvested material flow F, which it then moves backwards along a cleaning path P.

Figure 3:
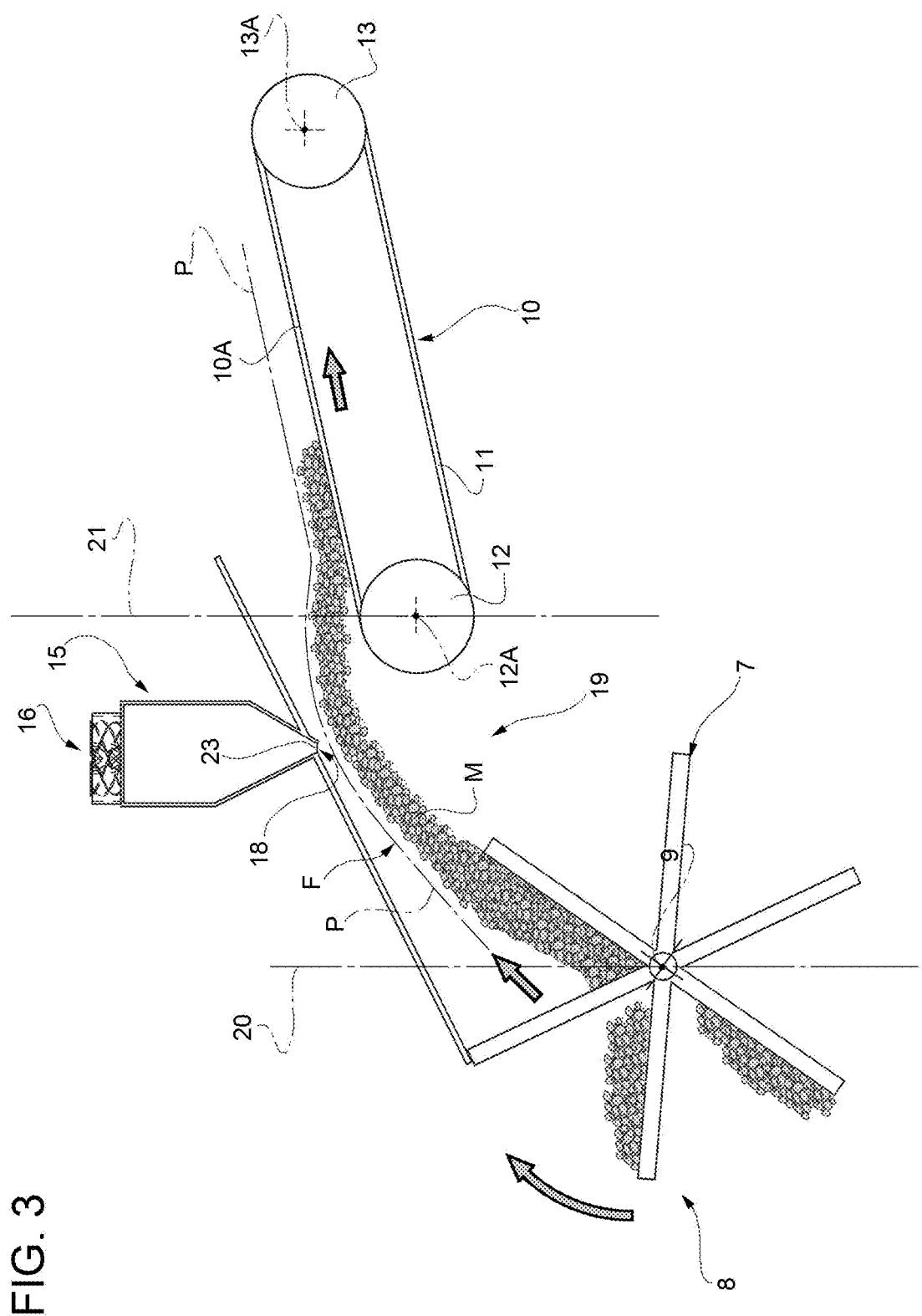
FIG. 3 schematically shows, in blocks, a detail of FIG. 2.

Along the cleaning path P there are arranged conveyor belts to convey the harvested material, only one of them being visible in FIGS. 2 and 3 and being indicated with 10.

With reference to FIG. 3, the conveyor belt 10 is arranged immediately downstream of the pickup roller 8 and comprises a belt 11 wound in a ring shape around two deflection rollers, one of them being a front roller and being indicated with 12 and the other one being a rear motorised roller and being indicated with 13; the deflection rollers 12 and 13 can rotate around respective fixed axes 12A and 13A, respectively, parallel to the axis 9.

The designing features of the belt 11 change depending on the type of fruit to be harvested. Generally, though not necessarily, the belt 11 has vertical through openings with dimensions that are smaller than the dimensions of the harvested fruit, so as allow at least part of the foreign bodies to fall through them, due to gravity, but prevent the fruit from doing so.

Figure 5:
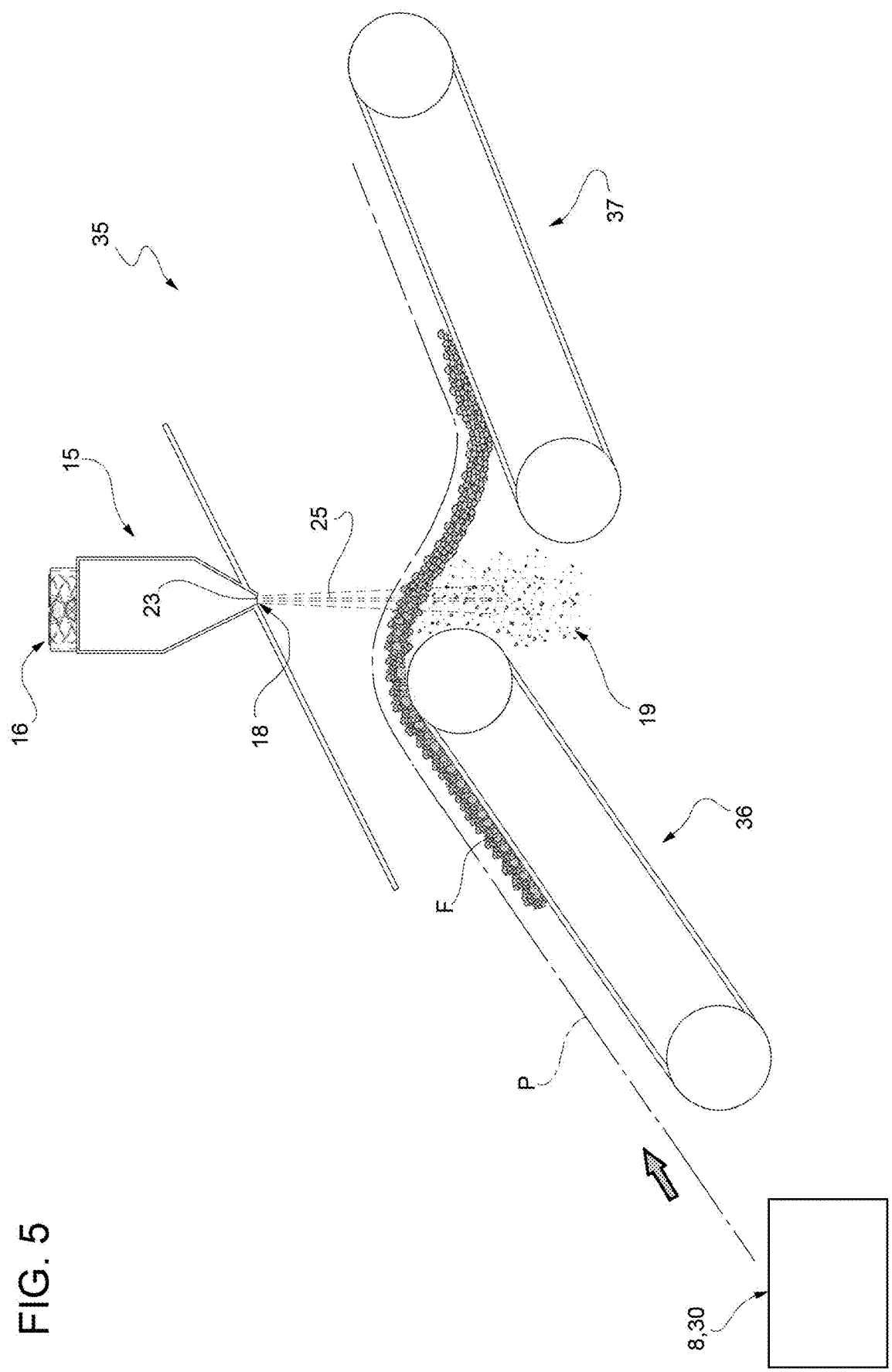
FIG. 5 schematically shows, substantially in blocks, a second embodiment of a harvesting machine according to the invention.

With reference to FIG. 2 and, in particular, to FIG. 5, the machine 1 finally comprises an adjustable blowing assembly 15 to clean the harvested material picked up by the harvesting device 7 and remove at least part of the foreign bodies before they reach the delivery branch 10A of the conveyor belt 10.

The blowing assembly 15 comprises a known fanning unit 16, which is schematically shown, can be adjusted so as to generate a cleaning airflow varying depending on the type of harvested material and is arranged above the moving path P of the harvested material.

The blowing assembly 15 comprises an outlet 18 arranged above the path P and configured to direct the cleaning air towards the harvested material flow during the passage of the harvested material from the harvesting device 7 to the conveyor 10, namely during the phase in which the harvested material passes over the empty space 19 delimited by the pickup roller 8, on one side, and by the roller 12, on the other side.

Preferably, the outlet 18 is arranged in a space which, in the moving direction of the machine 1, is delimited, on one side, by a vertical lying place 20 of the rotation axis 9 of the pickup roller 8 and, on the other side, by a vertical lying plane 21 of the rotation axis 12A of the deflection roller 12.

Conveniently, the outlet 18 is arranged closer to the deflection roller 12 than to the pickup roller 8.

According to a variant, the outlet 18 is arranged upstream or in front of the plane 20 and is oriented so as to direct the cleaning air backwards, though always towards the harvested material flow F.

Conveniently, the outlet 18 is arranged in front of the plane 20 and at a distance from the plane 20 ranging from zero to fifty centimetres.

In any case, the outlet 18 extends crosswise to the path P. Conveniently, the outlet 18 extends in a direction parallel to the axes 9 and 12A and substantially over the entire width of the delivery branch 10A or of the pickup roller 8.

Conveniently, furthermore, the outlet 18 has a constant passage section 23 in the direction parallel to the axes 9 and 12A.

However it is made, the outlet 18 is configured to generate an air curtain or flow 25 (FIG. 2) directed towards the harvested material flow F. Preferably, the outlet 18 is configured to generate an airflow vertically or not vertically directed downwards and parallel to the axes 9 and 12A.

In use, the cleaning air intersect the harvested material flow F during the passage from the pickup roller 8 to the deflection roller 12, namely when the harvested material moves in the absence of mechanical support, but only due to the thrust received by the pickup roller 8. In this way, the cleaning air easily leads to the ground, through the passage 19, at least part of the foreign bodies moving with the fruit before they reach the conveyor 10, thus carrying out a first cleaning of the harvested material.

Said first cleaning is extremely effective, since, thanks to the presence of the passage 19, there are no obstacles preventing the airflow and the foreign bodies from reaching the ground.

When the outlet 18 is arranged in front of the roller 8, the airflow could already clean the harvested material when it is still supported by the roller 8.

According to a variant shown in FIG. 4, the pickup roller 8 is replaced by a known pickup conveyor 30, which is not described in detail.

The variant shown in FIG. 5 relates to a harvesting machine 35, which differs from the machine 1 because of a different arrangement of the blowing assembly 15 along the cleaning path P and whose parts are indicated, when possible, with the same reference numbers as the corresponding parts of the machine 1.

The machine 35 comprises, along the cleaning path and downstream of the harvesting device 7, two cleaning conveyors indicated with 36 and 37. The two conveyors, which are known, are not described in detail and, for example, are similar to the conveyor 10, are spaced apart from one another along the path P so that between them there is the empty space 19, namely an interruption in the support surface.

Like in the machine 1, the cleaning airflow 25 emitted by the blowing assembly 15 flows through the empty space 19, over which the harvested material flow F passes.

According to a variant which is not shown herein, the machine 35 comprises at least two blowing assemblies arranged along the cleaning path P and in the area of relative interruptions in the support surfaces of the harvested material.

According to a further variant which is not show herein, at least one of the outlets 19 is arranged above the path P, but not in the area of the space 19 and is oriented so as to send the airflow 25 in a direction that is inclined relative to the vertical, so that the flow 25 drags the foreign bodies downwards along a non-vertical path.

Owing to the above, it is evident that machines 1 and 35 described herein can be subjected to changes and variants, without for this reason going beyond the scope of protection set forth in the independent claims.

In particular, the cleaning airflow 25 could be formed by a plurality of nozzles aligned or not aligned with one another, just like the outlet 18 could be arranged in positions other than the ones indicated above and the airflow could be oriented in a different direction than the vertical one, always in order to maximise the removal of foreign bodies as the harvested fruit or the composition/texture of the harvested material change, and the arrangement of the surfaces used to transport the harvested material could be different.

The invention claimed is:

1. A harvesting machine for harvesting fruits from the ground, the machine comprising:
    a cart configured to advance on the ground for harvesting along a harvesting direction;
    at least one picking member for picking up, from the ground, a harvested material consisting of the fruits and of foreign bodies mixed therewith, or arranged around, the fruits;
    an outlet opening for the fruits; and means for feeding the harvested material towards the outlet along a cleaning path for the harvested material and cleaning means arranged along the cleaning path to separate the foreign bodies from the fruits wherein the cleaning means comprise blowing means configured to generate at least one cleaning airflow for cleaning the harvested material and comprising at least one outlet for the cleaning airflow;

wherein the outlet being arranged above and crosswise to the cleaning path and orientated to direct the cleaning airflow crosswise and towards the harvested material when the harvested material moves in the absence of mechanical support;

wherein the picking member is a pickup roller or a pickup conveyor rotatable around a horizontal axis orthogonal to the harvesting direction and in that the means for feeding comprise a feed conveyor having an inlet delimiting with the pickup roller a passage overpassed, in use, by the harvested material fed along the cleaning path of the foreign bodies downwards;

wherein the outlet is arranged above the passage and orientated to direct the cleaning airflow and the foreign bodies towards the passage; and wherein the feed conveyor is higher than the pickup roller or pickup conveyor, the pickup roller or conveyor and feed conveyor advancing the fruits in the same direction.

2. The machine according to claim 1, characterised in that the means for feeding comprise, along the cleaning path, at least one pair of consecutive support surfaces for supporting the harvested material and delimit between one another a downwards passage overpassed, in use, by the harvested material and a transit path of the foreign bodies; and in that the outlet is orientated to direct the cleaning airflow towards the passage.

3. The machine according to claim 1, wherein the outlet is orientated to direct the airflow downwards in a substantially vertical direction.

4. The machine according to claim 1, wherein the feed conveyor comprises a deflection roller adjacent to the pickup roller and rotatable around an axis parallel to the axis of the pickup roller; the outlet being arranged in a space delimited by a first vertical plane of lie of the rotation axis of the pickup roller and by a second vertical plane of lie of the rotation axis of the deflection roller.

5. The machine according to claim 1, wherein the outlet is elongated and extends in a direction transverse to the cleaning path.

6. The machine according to claim 5, wherein the outlet has a section of passage constant along the transverse direction.

7. The machine according to claim 1, wherein the outlet is configured to generate an air curtain directed downwards and, in use, through the harvested material passing along the cleaning path.

* * * * *